(12) United States Patent
Krajnc et al.

(10) Patent No.: US 11,810,450 B2
(45) Date of Patent: Nov. 7, 2023

(54) EMERGENCY RADIO FREQUENCY-BASED SENSING FUNCTION

(71) Applicant: SIGNIFY HOLDING B.V., Eindhoven (NL)

(72) Inventors: Hugo Jose Krajnc, Eindhoven (NL); Peter Deixler, Arlington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 73 days.

(21) Appl. No.: 17/615,374

(22) PCT Filed: May 28, 2020

(86) PCT No.: PCT/EP2020/064889
§ 371 (c)(1),
(2) Date: Nov. 30, 2021

(87) PCT Pub. No.: WO2020/245031
PCT Pub. Date: Dec. 10, 2020

(65) Prior Publication Data
US 2022/0230518 A1 Jul. 21, 2022

Related U.S. Application Data

(60) Provisional application No. 62/857,914, filed on Jun. 6, 2019.

(30) Foreign Application Priority Data

Jul. 2, 2019 (EP) ..................................... 19183821

(51) Int. Cl.
G08B 19/00 (2006.01)
G08B 7/06 (2006.01)
(Continued)

(52) U.S. Cl.
CPC ............. *G08B 7/066* (2013.01); *G08B 21/02* (2013.01); *G08B 31/00* (2013.01)

(58) Field of Classification Search
CPC ........ G08B 7/066; G08B 21/02; G08B 31/00; G08B 29/188; G08B 17/00; G08B 13/2491; G08B 15/00; Y02B 20/40
(Continued)

(56) References Cited

U.S. PATENT DOCUMENTS 9,560,729 B2 * 1/2017 Cutsforth ............... H01R 39/12
9,572,226 B2 * 2/2017 Motley ................... H05B 47/18
(Continued)

FOREIGN PATENT DOCUMENTS

WO 2011015975 A2 2/2011
WO 2016142223 A1 9/2016
WO 2019043563 A1 3/2019

*Primary Examiner* — Tai T Nguyen (57) ABSTRACT

A method for use in a lighting system for rendering emergency lighting comprises detecting (101) a switch from a normal mode of the lighting system to an emergency mode of the lighting system and a switch from the emergency mode to the normal mode and activating (103) an emergency radio frequency-based sensing function upon detecting the switch from the normal mode to the emergency mode. The radio frequency-based sensing comprises detection of disturbances to a radio frequency field. The method further comprises deactivating (105) the emergency radio frequency-based sensing function upon detecting the switch from the emergency mode to the normal mode.

14 Claims, 4 Drawing Sheets

(51) Int. Cl.
  *G08B 21/02*  (2006.01)
  *G08B 31/00*  (2006.01)
(58) Field of Classification Search
  USPC .......................................................... 340/521
  See application file for complete search history.

(56)     References Cited

U.S. PATENT DOCUMENTS 10,142,814 B2 *  11/2018  Jatavallabhula ........ H04W 4/90
  10,627,292 B1 *  4/2020   Fowler ................... H04R 29/00
  2014/0001963 A1  1/2014   Chobot et al.
  2019/0295397 A1 * 9/2019  Eckert ...................... G08B 5/36
  2020/0084608 A1 * 3/2020  Chung .................. H04W 4/026
  2020/0402378 A1 * 12/2020 Connell, II ............ G08B 25/04

* cited by examiner

EMERGENCY RADIO FREQUENCY-BASED SENSING FUNCTION

CROSS-REFERENCE TO PRIOR APPLICATIONS

This application is the U.S. National Phase application under 35 U.S.C. § 371 of International Application No. PCT/EP2020/064889, filed on May 28, 2020, which claims the benefits of European Patent Application No. 19183821.8, filed on Jul. 2, 2019 and U.S. Patent Application No. 62/857,914, filed on Jun. 6, 2019. These applications are hereby incorporated by reference herein.

FIELD OF THE INVENTION

The invention relates to an electronic device for use in a lighting system for rendering emergency lighting.

The invention further relates to a method for use in a lighting system for rendering emergency lighting.

The invention also relates to a computer program product enabling a computer system to perform such a method.

BACKGROUND OF THE INVENTION

Emergency lighting systems are common in offices and education facilities, amongst others. They help occupants of a building find the emergency exits, especially when power has been cut.

WO 2011/015975 A1 discloses a light guidance system for adapted illumination in emergency or power cut situations, wherein the light guidance system is connected to an auxiliary power supply system and comprises at least one light unit adapted to emit light for illuminating surroundings and a control unit adapted to increase a light level of the light unit according to a presence signal indicating the presence of a person. The increasing of the light level is adjusted to enable a mandatory lighting period and a mandatory light level by considering a power value, e.g. battery charge status, of the auxiliary power supply system.

In offices and education facilities, there is a strong desire for the lighting system to support first responders during emergencies. First responders such as firemen are specifically interested in where in the building people are still present or tracking of the location of a school shooter (the only person moving in a school shooting is typically the shooter).

SUMMARY OF THE INVENTION

It is a first object of the invention to provide an electronic device, which enables an emergency lighting system to perform an emergency function additional to emergency lighting.

It is a second object of the invention to provide a method, which can be used in an emergency lighting system to perform an emergency function additional to emergency lighting.

In a first aspect of the invention, an electronic device for use in a lighting system for rendering emergency lighting comprises at least one communication interface and at least one processor configured to detect a switch from a normal mode of said lighting system to an emergency mode of said lighting system and a switch from said emergency mode to said normal mode, use said at least one communication interface to activate an emergency radio frequency-based sensing function upon detecting said switch from said normal mode to said emergency mode, said radio frequency-based sensing comprising detection of disturbances to a radio frequency field, and deactivate said emergency radio frequency-based sensing function upon detecting said switch from said emergency mode to said normal mode.

Radio Frequency (RF)-based sensing provides a mechanism to infer motion or presence of people in an environment based on how radio frequency signals transmitted by a set of nodes are affected by the human body. RF-based sensing in a regular lighting system typically does not work when the power to the luminaires has dropped e.g. during a brownout or blackout caused by a fire. In order to provide sensing information to first responders, an RF-based sensing function is included in an emergency lighting system.

When utilizing lighting devices for RF-based sensing, a trade-off has to be made between the RF-based sensing performance and the latency constraints of the lighting controls. Since latency constraints are normally not an issue for emergency lighting, emergency lighting is very suitable for RF-based sensing. Since RF-based sensing typically consumes a relatively large amount of processing and network resources, a special emergency RF-based sensing function is activated when a switch to an emergency mode is detected.

This allows more processing and/or network resources to be allocated to the emergency RF-based sensing function, e.g. to perform people counting instead of only sensing whether anyone is present or not. This would normally impact other RF functions inside and/or outside the lighting system, but these other RF functions are less important in an emergency. RF-based sensing need not be deactivated when the emergency RF-based sensing function is deactivated; the RF-based sensing may continue under different operational conditions/parameters.

The switch from the normal mode to the emergency mode and the switch from the emergency mode to the normal mode may be detected based on a communication signal, e.g. received from an alarm system, or may be detected from the power signal, e.g. by noticing that there is no longer any mains power and instead a battery has kicked in. In the United States, each emergency luminaire has its own battery as backup. Each emergency luminaire has two mains wires coming in; the first mains wire is switched (e.g. with a wall switch); the second mains wire is uninterrupted mains on a separate power grid dedicated to emergency lighting only. If the power on the uninterrupted mains wire drops, it gets detected by the emergency LED driver and it takes over the LED load by supplying battery power to the LEDs. In Germany, centralized emergency systems are used (no batteries within the luminaire).

Said at least one processor may be configured to activate said emergency radio frequency-based sensing function by starting to transmit radio frequency signals. Alternatively or additionally, said at least one processor may be configured to activate said emergency radio frequency-based sensing function by starting to receive radio frequency signals and detect said disturbances in said radio frequency field based on said received radio frequency signals. Typically, an RF-based sensing device only comprises one transceiver and is not able to transmit and receive RF signals at the same time, although an RF-based sensing device may be configured to alternate transmission and reception of RF signals. If alternate transmission and reception is not used, then a first set of RF-based sensing nodes may be assigned the transmission function and a second set of RF-based sensing nodes may be assigned the reception function.

Said electronic device may comprise a light source for rendering emergency lighting and said at least one processor may be configured to turn on said light source upon detecting said switch from said normal mode to said emergency mode. Alternatively, the electronic device may have its light source always turned on or may be a type of electronic device other than a lighting device.

Said at least one processor may be configured to use said at least one communication interface to control a further electronic device in said lighting system to activate said emergency radio frequency-based sensing function upon detecting said switch from said normal mode to said emergency mode, said further electronic device being capable of rendering emergency lighting, and use said at least one communication interface to control said further electronic device to deactivate said emergency radio frequency-based sensing function upon detecting said switch from said emergency mode to said normal mode. By letting the electronic device, e.g. a central controller, activate the emergency RF-based sensing function on the emergency lighting devices, the emergency lighting devices may be simpler to design and manufacture.

Alternatively, the emergency RF-based sensing function may be activated locally on the sensing devices themselves rather than centrally activated. This may make it possible to avoid a situation in which the cause of the emergency prevents a central controller from activating the emergency RF-based sensing function on the sensing devices.

Said at least one processor may be configured to use said at least one communication interface to activate a normal radio frequency-based sensing function upon detecting said switch from said emergency mode to said normal mode. This is beneficial if is desirable to support RF-based sensing, e.g. on emergency lighting devices, even when there is no emergency.

Location tracking and/or activity detection may be performed by said emergency radio frequency-based sensing function and people counting may be performed by said normal radio frequency-based sensing function, for example. Additionally or alternatively, said radio frequency-based sensing may be performed with higher accuracy and/or with lower latency by said emergency radio frequency-based sensing function than by said normal radio frequency-based sensing function, for example.

Additionally or alternatively, a status (e.g. open/closed) of a door and/or window may be determined by said emergency radio frequency-based sensing function. This is valuable information for fire fighters to forecast the progression of a fire. For instance, if a fire door is open, evacuation routes may be chosen to avoid the smoke coming to the staircase by this open door.

Different groups, e.g. pairs, of luminaires may be assigned to perform the emergency RF-based sensing function than the normal RF-based sensing function. As a first example, when RF-based sensing is used for lighting control in normal operation, two horizontally adjacent luminaires may perform RF-based sensing. In the case of an emergency, it may be advantageous to assign two luminaires located, for instance, at different floors of the building to team up to perform RF-based sensing. In this case, the football shaped RF-based sensing detection area between the two luminaires is vertically oriented, thereby yielding a better localization of upright human bodies passing through.

As a second example, occupancy sensing lighting control in the open office space may be performed in normal operation, while in an emergency situation, the emergency exit area is of interest the most (e.g. to count the people leaving the space via the staircase). The luminaires assigned to perform RF-based sensing during an emergency may also change due to fire, e.g. because certain electricity circuits stop working while others are still powered. In this case, unusual groups, e.g. pairs, of luminaires may be assigned the task of emergency sensing as they are the only ones available. Furthermore, first responders may be able to indicate a certain area of interest on the building map in real time. Luminaires are then assigned to take high resolution scans of this specific area (e.g. to locate a school shooter suspected in a utility room area).

First responders may be detected in the emergency mode, e.g. via user devices worn by the first responders that transmit RF (e.g. BLE) beacons, to provide better context. When reporting that a human body mass has been detected, the electronic device may add that it detected a first responder in the vicinity. This may allow someone else, e.g. another first responder, to determine that the detected human body is likely not a victim.

The emergency RF-based sensing function may also be used to perform breathing detection and/or fall detection, e.g. if WiFi-based sensing is used, and in the future to perform gesture detection, e.g. if 60 GHz WiFi-based sensing is used. The emergency RF-based sensing function may also be used to allow firefighters to assess the structural integrity of a building. For example, as the RF-based sensing of a battery-operated luminaire will continue even when the mains power is off, it may be configured to detect if a portion of the ceiling has collapsed and hence the wireless multipath propagation of the RF-based sensing has suddenly changed.

Said radio frequency-based sensing may be performed by said emergency radio frequency-based sensing function in dependence on a charge level of at least one battery of at least one electronic device in said lighting system. As a first example, a lighting device may use a fast messaging scheme if it has more than 80% battery and a slower messaging scheme if it has less than 80% battery. This may help ensure that batteries are not drained during an emergency while a lower sensing latency and a higher sensing accuracy may be offered whenever possible.

As a second example, the type of metrics determined with the RF-based sensing may depend on the battery charge level. For instance, detecting motion normally requires a lot less CPU power than people counting, so people counting may be performed at first and presence detection may be performed later, when the battery level drops below a certain threshold. Similarly, different variations of an algorithm may be used to determine the same type of metric, but with different accuracy, as this might also impact power consumption. For instance, if the battery is more than 80% full, motion sensing with high sensitivity that has a 2% error rate may be performed, but if the battery is less than 80% full, motion sensing with low sensitivity that has a 7% error rate may be performed.

A rate at which radio frequency signals are transmitted by said emergency radio frequency-based sensing function may be repeatedly increased over time and/or radio frequency signals are transmitted at a higher or lower power by said emergency radio frequency-based sensing function than by a normal radio frequency-based sensing function. The longer an emergency takes, the more important it becomes to find people still in the building, as these people are probably not able to get out by themselves. RF-based sensing may help find any people still in the building and increasing the rate at which the RF signals are transmitted may therefore be beneficial. The transmit power may be decreased, for example, it is desirable to confine the RF signal within a specific room. During emergency-grade sensing, the message rate may be increased while transmit power is decreased. In other circumstances, the transmit power may be increased, for instance to cover with emergency RF sensing an adjacent utility room which does not have any RF lights (in this way, fire fighters can see if people are in this room, for example), while under normal-mode operation, this room is not interesting.

Said at least one processor may be configured to use said at least one communication interface to transmit messages that comprise information determined using said emergency radio frequency-based sensing function to one or more user devices upon detecting said switch from said normal mode to said emergency mode. These messages may be transmitted to user devices of first responders, for example. These messages may inform the first responders where people are located and/or where a fire is located, for example. Alternatively or additionally, light effects may be used to send a visual message to a human upon detecting him with RF-based sensing. For instance, aggressive blinking for the location the burglar at night has been detected. Alternatively or additionally, a speaker located in a room, e.g. incorporated into a luminaire, may be used to play a prerecorded message upon detecting a person. For instance, a scared person who is hiding may be localized using RF-based sensing and the speaker may let him know that the alarm is a fire alarm and he must leave the room now.

Said at least one processor may be configured to determine whether signal strengths of received radio frequency signals are fluctuating according to a certain pattern (e.g. slowly but continuously increasing) in a certain spatial area and indicate said certain spatial area in one or more of said messages transmitted to said one or more user devices. This allows thermal drift to be detected and thus the location of a fire to be located and communicated to first responders. Typically, multiple areas would be covered by the RF-based sensing, providing granularity over a full office floor. If one meeting room would be on fire, the signals of the sensing nodes in that room would show a pattern different than those in adjacent rooms. Analysis of these patterns makes it possible to conclude whether there is a fire as opposed to motion and information on the locations of the sensing nodes makes it possible to determine where the fire is.

Said at least one processor may be configured to detect that one or more sprinklers are active in a certain spatial area and indicate said certain spatial area in one or more of said messages transmitted to said one or more user devices. When sprinklers are triggered, they eject large amounts of water over a large area. As water absorbs/distorts RF signals, it may be possible to determine where sprinklers have been activated using RF-based sensing. RF-based sensing may be used to detect whether sprinkler water is in the air and/or whether a layer of water has formed on the surface of the floor.

The first responders may be informed which sprinklers are working. Furthermore, this information may be used to indirectly locate a fire. Upon detecting the sprinklers, different RF-based sensing nodes may be assigned to perform the RF-based sensing. For instance, the RF-based sensing of a lighting device right next to a sprinkler will be affected and should therefore preferably be avoided. Both above ideas could be combined to give more context. For example, the following may be identified:

Room with no fire and no sprinkler active (possibly indicating that the room is not an area of interest)

Room with no fire and sprinkler active (possibly indicating there is a lower chance of a fire starting in this room, or that a firer existed in this room and it has been extinguished)

Room with fire and no sprinkler active (possibly indicating that the room is a dangerous area)

Room with fire and sprinkler active (possibly indicating that the room is a slightly less dangerous area than the room described above)

Said at least one processor may be configured to use said at least one communication interface to deactivate at least one function other than a radio frequency-based sensing function upon detecting said switch from said normal mode to said emergency mode. For instance, other RF functions (e.g. communications) may be stopped in the emergency lighting mode. This may ensure that more processing and/or network resources are available for RF-based sensing in the emergency mode. As an example, a lighting system that normally transmits temperature data every second to a gateway may be configured to no longer transmit temperature data in the emergency mode.

In a second aspect of the invention, a method for use in a lighting system for rendering emergency lighting comprises detecting a switch from a normal mode of said lighting system to an emergency mode of said lighting system and a switch from said emergency mode to said normal mode, activating an emergency radio frequency-based sensing function upon detecting said switch from said normal mode to said emergency mode, said radio frequency-based sensing comprising detection of disturbances to a radio frequency field, and deactivating said emergency radio frequency-based sensing function upon detecting said switch from said emergency mode to said normal mode. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations comprising: detecting a switch from a normal mode of said lighting system to an emergency mode of said lighting system and a switch from said emergency mode to said normal mode, activating an emergency radio frequency-based sensing function upon detecting said switch from said normal mode to said emergency mode, said radio frequency-based sensing comprising detection of disturbances to a radio frequency field, and deactivating said emergency radio frequency-based sensing function upon detecting said switch from said emergency mode to said normal mode.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
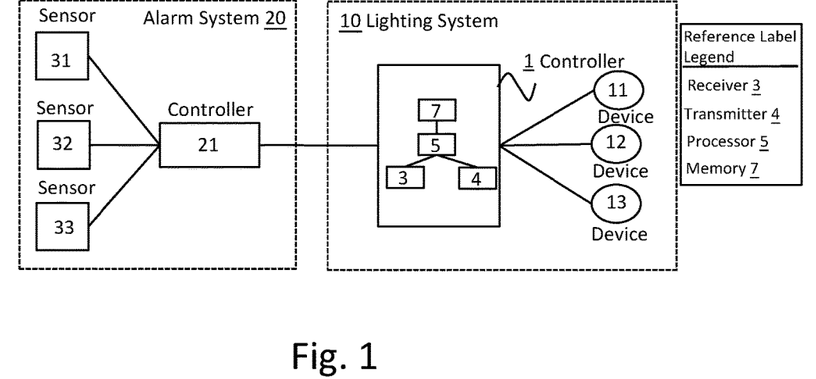
FIG. 1 is a block diagram of a first embodiment of the electronic device.

FIG. 1 shows a first embodiment of the electronic device for use in a lighting system for rendering emergency lighting: controller 1. Controller 1 is part of lighting system 10. Controller 1 is connected to an alarm system 20 and lighting devices 11-13. The lighting devices 11-13 are capable of rendering emergency lighting. The alarm system 20 comprises an alarm system controller 21 and smoke sensors 31-33. When any one of the smoke sensors 31-33 is triggered, this causes the alarm system controller 21 to transmit a message to the controller 1. This message informs the controller 1 that a mode switch has taken place and indicates the new mode.

The controller 1 comprises a receiver 3, a transmitter 4, a processor 5, and a memory 7. The processor 5 is configured to use the receiver 3 to detect, based on the message(s) received from the alarm system 20, a switch from a normal mode of the lighting system 10 to an emergency mode of the lighting system 10 and a switch from the emergency mode to the normal mode.

In the embodiment of FIG. 1, the processor 5 is further configured to use the transmitter 4 to control the lighting devices 11-13 to activate an emergency radio frequency-based sensing function upon detecting the switch from the normal mode to the emergency mode. The processor 5 is also configured to use the transmitter 4 to control the lighting devices 11-13 to deactivate the emergency radio frequency-based sensing function upon detecting the switch from the emergency mode to the normal mode. The radio frequency-based sensing comprises detection of disturbances to a radio frequency field.

It is not necessary for the lighting devices 11-13 to know which mode is operational. For example, the lighting devices 11-13 may each have a first mode in which low-resolution RF-based sensing scans are performed and a second mode in which high-resolution RF-based sensing scans are performed. The controller 1 may activate the high-resolution scan upon detecting the switch to the emergency mode and activate the low-resolution scan upon detecting the switch to the normal mode.

In order to perform an RF-based sensing scan, one device should be transmitting RF signals and one or more devices should be receiving these RF signals. Multiple RF-based sensing scans may be performed at the same time by different devices. The controller 1 may be configured to assign lighting devices to sensing groups and/or may be configured to instruct each lighting device whether to transmit or receive RF signals (or alternatively, when to transmit and receive RF signals).

Typically, 1 in 10 office lights in the United States are emergency lights. Often, these lights are turned on permanently. It is known to use a wireless network to monitor the health of an emergency lighting system. Emergency lighting devices which only uses wireless, e.g. Zigbee, connectivity to allow the emergency backup battery status to be monitored but do not use wireless connectivity for lighting control, are ideal candidates to assign for intra-floor occupancy sensing. As there is no need for low latency lighting control of emergency lighting devices (and from the application perspective no need for lighting control altogether), there is no downside of assigning the emergency lighting devices to a separate wireless, e.g. Zigbee, network that is different from a wireless, e.g. Zigbee, network used by the regular lighting devices.

These emergency lighting devices can be kept dormant or kept at reduced performance when it comes to RF-based sensing, such that they limit any impact they might have on the network but can become active whenever an emergency situation arises. For example, if there is a power outage, emergency lighting devices (being battery powered) will switch to their battery power supply while normal lighting devices will be powered off. In this case, the emergency lighting devices can start RF-based sensing at a performance level proportional to the detection needs (set by e.g. local regulations). This means that they can go at full speed messaging rates, ensuring lowest latency and highest detection accuracy, to e.g. detect if there are any people still present in areas deemed unsafe. They can also disregard normal considerations related to dynamic lighting control.

In the embodiment of FIG. 1, only emergency lighting devices perform RF-based sensing during emergencies. In an alternative embodiment, regular lighting devices take part in RF-based sensing during emergencies as well. These are preferably battery-equipped lighting devices, but while small and mid-sized commercial buildings mostly leverage LED luminaires with integrated power pack in the fixture, many larger commercial buildings use a central backup generator. Typically, only a subset of the regular lighting devices is wired to the backup generator.

These battery-equipped lighting devices and lighting devices wired to the backup generator may be part of both a wireless network that comprises the emergency lighting devices and a wireless network that comprises the regular lighting devices to avoid that lighting devices need to be reassigned during an emergency, which would make the RF-based sensing suboptimal for a short time. Both networks may be used for RF-based sensing.

Alternatively, these battery-equipped lighting devices and lighting devices wired to the backup generator may be assigned to the wireless network that comprises the emergency lighting devices upon detecting a switch to the emergency mode (e.g. triggered by a smoke detector alarm).

In the embodiment of the controller 1 shown in FIG. 1, the controller 1 comprises one processor 5. In an alternative embodiment, the controller 1 comprises multiple processors. The processor 5 of the controller 1 may be a general-purpose processor, e.g. ARM-based, or an application-specific processor. The processor 5 of the controller 1 may run a Unix-based operating system for example. The memory 7 may comprise one or more memory units. The memory 7 may comprise one or more hard disks and/or solid-state memory, for example.

The receiver 3 and the transmitter 4 may use one or more wired or wireless communication technologies such as Ethernet and/or Zigbee to communicate with the alarm system controller 21 and the lighting devices 11-13, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The controller 1 may comprise other components typical for a controller such as a power connector. The invention may be implemented using a computer program running on one or more processors.

Figure 2:
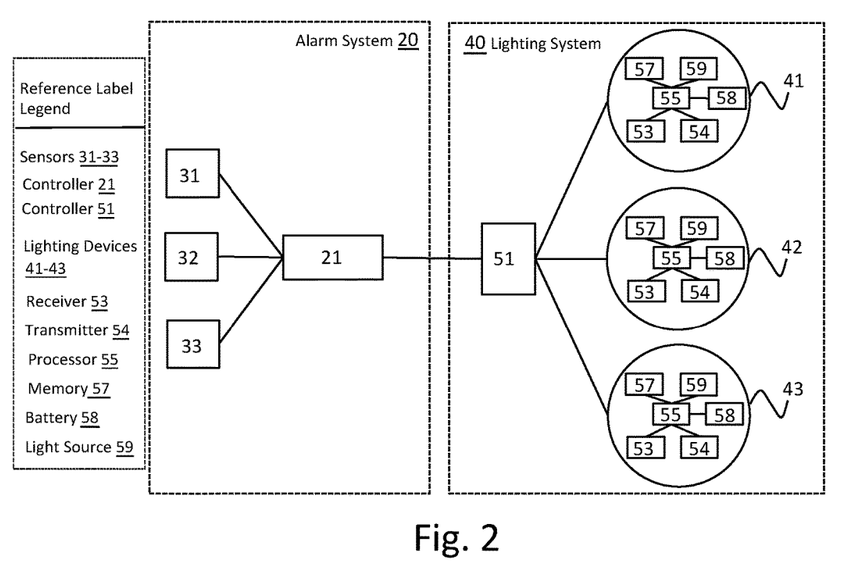
FIG. 2 is a block diagram of a second embodiment of the electronic device.

FIG. 2 shows a second embodiment of the electronic device: lighting devices 41-43. The lighting devices 41-43 are capable of rendering emergency lighting and are part of lighting system 40. Controller 51 is also part of lighting system 40. Controller 51 is connected to an alarm system 20 and lighting devices 41-14. The alarm system 20 comprises an alarm system controller 21 and smoke sensors 31-33.

The lighting devices 41-43 each comprise a receiver 53, a transmitter 54, a processor 55, a memory 57, a battery 58, and a light source 59 for rendering emergency lighting. Each processor 55 is configured to use the receiver 53 to detect a switch from a normal mode of the lighting system 40 to an emergency mode of the lighting system 40 and a switch from the emergency mode to the normal mode.

In the embodiment of FIG. 2, each processor 55 is further configured to use the transmitter 54 to activate an emergency radio frequency-based sensing function upon detecting the switch from the normal mode to the emergency mode by using the transmitter 54 starting to transmit radio frequency signals in a transmission mode. The radio frequency-based sensing comprising detection of disturbances to a radio frequency field. The processor 55 is also configured to deactivate the emergency radio frequency-based sensing function upon detecting the switch from the emergency mode to the normal mode.

In the embodiment of FIG. 2, each processor 55 is further configured to activate the emergency radio frequency-based sensing function by starting to use the receiver 54 to receive radio frequency signals and detect the disturbances in the radio frequency field based on the received radio frequency signals in a reception mode. In the embodiment of FIG. 2, the processor 55 is not able to transmit and receive RF signals at the same time, but this is possible in an alternative embodiment.

In the embodiment of FIG. 2, each of the lighting devices 41-43 can be set into a transmission mode in which it transmits RF signals for RF-based sensing or into a reception mode in which it receives RF signals for RF-based sensing. The lighting devices 41-43 may be configured to choose one of these modes themselves and/or may be configured to allow controller 51 to instruct them assume one of these modes, as described in relation to FIG. 1 with respect to controller 1 and lighting devices 11-13.

In the embodiment of FIG. 2, the processor 55 is configured to turn on the light source 59 upon detecting the switch from the normal mode to the emergency mode. In an alternative embodiment, the processor 55 is configured to turn on the light source 59 whenever the lighting device is powered on so that the light source 59 would normally always be on.

In the embodiment of FIG. 2, the emergency radio frequency-based sensing function performs the radio frequency-based sensing in dependence on a charge level of at least one battery of at least one electronic device in the lighting system 40. In the embodiment of FIG. 2, the lighting devices 41-43 comprises a battery 58 and the processors 55 of the lighting devices 41-43 perform the radio frequency-based sensing in dependence on a charge level of their battery 58. In an alternative embodiment, the lighting devices 41-43 are configured to perform the radio frequency-based sensing also in dependence on the charge levels of the batteries of the other lighting devices.

By considering the battery charge levels, it may be ensured that the RF-based sensing does not drain the batteries of the emergency lighting devices, whose main goal remains to provide a minimum level of lighting. For example, messages may be transmitted at a high rate by and to lighting devices that have more than 80% battery and at a lower rate by and to lighting devices that have less than 80% battery. These two sets of lighting devices may communicate which each other to combine the results of their RF-based sensing. This would ensure that detection still takes place at a decent enough performance while being mindful of additional operational parameters of the system.

In the embodiment of the lighting devices 41-43 shown in FIG. 2, the lighting devices 41-43 each comprise one processor 55. In an alternative embodiment, one or more of the lighting devices 41-43 comprise multiple processors. The processors 55 of the lighting devices 41-43 may be general-purpose processors, e.g. ARM-based, or application-specific processors, for example. The processors 55 of the lighting devices 41-43 may run a Unix-based operating system for example. The memories 57 may comprise one or more memory units. The memories 57 may comprise solid-state memory, for example. The light sources 59 may each comprise one or more LED diodes, for example.

The receivers 53 and the transmitters 54 may use one or more wired or wireless communication technologies such as Zigbee to communicate with the controller 51, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 53 and the transmitter 54 are combined into a transceiver. The lighting devices 41-43 may comprise other components typical for a lighting device such as a power connector. The invention may be implemented using a computer program running on one or more processors.

Figure 3:
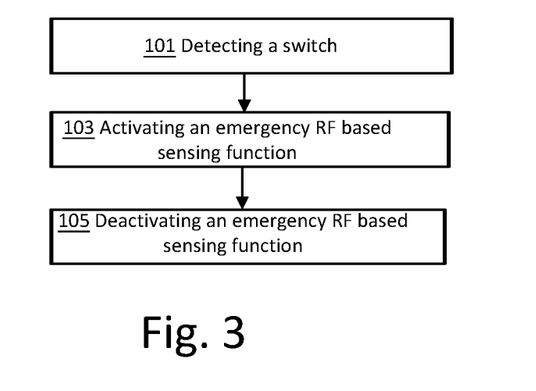
FIG. 3 is a flow diagram of a first embodiment of the method.

A first embodiment of the method for use in a lighting system for rendering emergency lighting is shown in FIG. 3. A step 101 comprises detecting a switch from a normal mode of the lighting system to an emergency mode of the lighting system and a switch from the emergency mode to the normal mode.

A step 103 comprises activating an emergency radio frequency-based sensing function upon detecting the switch from the normal mode to the emergency mode. The radio frequency-based sensing comprises detection of disturbances to a radio frequency field. A step 105 comprises deactivating the emergency radio frequency-based sensing function upon detecting the switch from the emergency mode to the normal mode.

Figure 4:
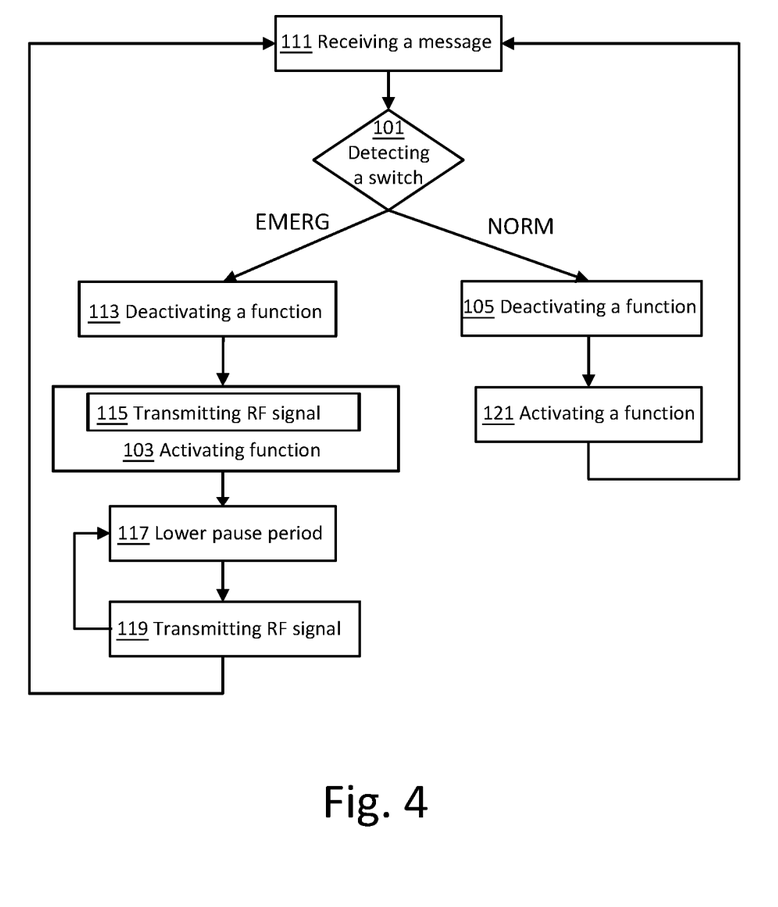
FIG. 4 is a flow diagram of a second embodiment of the method.

A second embodiment of the method for use in a lighting system for rendering emergency lighting is shown in FIG. 4. A step 111 comprises receiving a message from an alarm system. The message informs the lighting system that a mode switch has taken place and indicates the new mode. Step 101 comprises detecting a switch from a normal mode of the lighting system to an emergency mode of the lighting system and a switch from the emergency mode to the normal mode based on the message received in step 111.

If the message indicates a switch to the emergency mode, step 113 is performed next. If the message indicates a switch to the normal mode, step 105 is performed next. Step 113 comprises deactivating at least one function other than a radio frequency-based sensing function upon detecting the switch from the normal mode to the emergency mode. Step 103 is performed after step 113.

As described in relation to FIG. 3, step 103 comprises activating an emergency radio frequency-based sensing function upon detecting the switch from the normal mode to the emergency mode. In the embodiment of FIG. 4, step 103 comprises a sub step 115. Step 115 comprises activating the emergency radio frequency-based sensing function by starting to transmit radio frequency signals.

Next, in the embodiment of FIG. 4, a rate at which radio frequency signals are transmitted by the emergency radio frequency-based sensing function is repeatedly increased over time. In a step 117, the method pauses until a timer has reached zero. The first time that step 117 is performed, the timer has been set to an initial pause period. After the timer expires, the pause period is decreased. The next time that step 117 is performed, the timer is set to the lower pause period. The pause period is decreased each iteration of step 117, but not decreased below a predetermined minimum pause period.

After the timer has elapsed in step 117, a step 119 is performed. Step 119, like step 115, comprises transmitting a radio frequency signal for RF-based sensing. Step 117 is repeated after step 119 until a new message is received from the alarm system and step 111 is performed again. As a result, the amount of time spent on transmitting RF signals, and thus the transmission rate, increases over time. The transmission rate may also be increased by using more frequency resources and/or by using a more efficient encoding techniques, for example.

Thus, the transmission rate starts low but starts increasing as time goes by. This can be interpreted as the system realizing that emergency has not been solved yet and that there therefore must be something preventing it from being solved. One of these problems might be that there are people missing, for which RF-based sensing can provide a solution. The light output level of the emergency lighting devices may be decreased correspondingly. If not enough time has elapsed, the system may assume that it is too early to worry and that maintaining emergency lighting should be prioritized.

The transmission rate may also be modified dynamically as a function of battery level. The transmission rate may start reducing after the battery level crosses a lower threshold and reduce from there onwards e.g. linearly/quadratically with the battery level. Furthermore, first responders may be able to modify the transmission rate according to their needs. For example, when a fireman enters the floor, the lighting system may recognize his Bluetooth Low Energy (BLE) beacon (transmitted by his smartphone, for example) and initiate a high-resolution RF-based sensing burst to localize people on the floor or track the fireman's movement on the floor.

A step 105 comprises deactivating the emergency radio frequency-based sensing function upon detecting the switch from the emergency mode to the normal mode. A step 121 is performed after step 105. Step 121 comprises activating a normal radio frequency-based sensing function upon detecting the switch from the emergency mode to the normal mode. Step 111 is repeated after step 121.

The emergency radio frequency-based sensing function performs RF-based sensing with a higher accuracy and/or lower latency than the normal frequency-based sensing function. This makes it possible to perform location tracking and/or activity detection with the emergency radio frequency-based sensing function, while it is only possible to perform people counting or presence detection with the normal frequency-based sensing function, for example.

Figure 5:
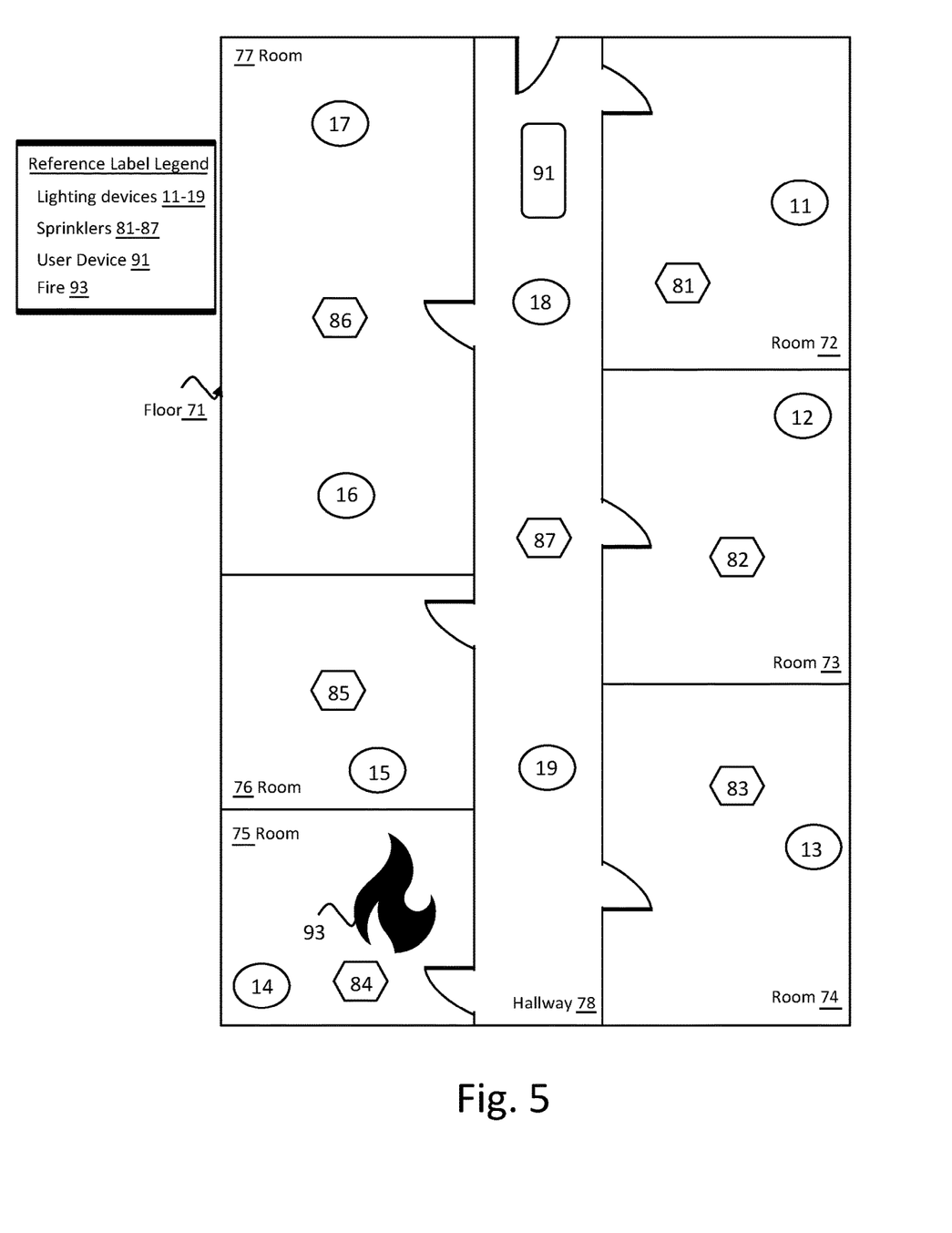
FIG. 5 shows an example of a floor with lighting devices and sprinklers on which a fire is burning that a first responder wants to locate.

FIG. 5 shows an example of a floor 71 with lighting devices 11-19 and sprinklers 81-87 on which a fire 93 is burning that a first responder wants to locate. The first responder has a user device 91, e.g. a smartphone. The floor 71 has six rooms 72-77 and a hallway 78. Lighting device 11 and sprinkler 81 have been installed in room 72, lighting device 12 and sprinkler 82 have been installed in room 73, and lighting device 13 and sprinkler 83 have been installed in room 74.

Furthermore, lighting device 14 and sprinkler 84 have been installed in room 75, lighting device 15 and sprinkler 85 have been installed in room 76, lighting devices 16 and 17 and sprinkler 86 have been installed in room 77, and lighting devices 18 and 19 and sprinkler 87 have been installed in hallway 78.

While in the embodiments of FIGS. 1 and 2, fires were detected with the help of smoke detectors, fires can alternatively or additionally be detected with the help of RF-based sensing. After the switch from the normal mode to the emergency mode has been detected, messages may be transmitted to user devices like user device 91 that comprise information determined using the emergency radio frequency-based sensing function. These messages may also indicate the whereabouts of people (e.g. in which room of floor 71 motion has been detected).

These messages may indicate one or more spatial areas in which a fire has been detected or in which a sprinkler has been detected to be active. When signal strengths of received radio frequency signals are fluctuating according to a certain pattern in a certain spatial area, a fire may be considered to burn in this certain spatial area. Furthermore, it is likely that a fire is burning in or near one of the spatial areas in which a sprinkler has been detected to be active. This sprinkler may have an embedded smoke alarm or may be coupled to a nearby smoke alarm, for example.

Thus, in the embodiment of the method illustrated in FIG. 5, it is possible to determine the likelihood of fire in the vicinity of emergency lighting devices performing RF-based sensing based on the thermal drift of RF-based sensing response (as those lighting devices will see RSSI fluctuating in a steady direction as a result of increasing temperatures). The likelihood of fire may also be determined based on contextually unexpected detection results (e.g. correlation with another sensing technology or increased amounts of triggers or fluctuation in confidence levels). Depending on how widespread these effects are, the method might be able to confirm and monitor the size of fire. In home systems, for example, this can help by preventing opening of automatic garage door if a fire has been detected in the garage.

As described above, RF-based sensing can also provide confirmation on whether the automated sprinkler system is working. When they are triggered, sprinklers will eject large amounts of water over a large area. As water absorbs/distorts RF signals, an RF-based sensing system will interpret this significantly differently from human motion, as the disturbances from sprinklers will be much more distributed over the sensing space than e.g. a human moving through the space. This can be used to also indirectly detect fires in a building.

Furthermore, RF-based sensing during an emergency could be used to monitor if a fire door is closed by monitoring the wireless transmission between a first space on one side of the fire door and a second space on a second side of the fire door. RF-based sensing could also be used to monitor if an elevator door is opening during emergency (which should not happen), so that countermeasures can be taken.

In the example of FIG. 5, the fire 93 is burning in room 75 and may be detected with the help of RF-based sensing performed by lighting device 14 and at least one of lighting devices 13, 15 and 19. For example, lighting device 14 may be transmitting RF signals for RF-based sensing and one or more of lighting devices 13, 15 and 19 may be receiving these RF signals or one or more of lighting devices 13, 15 and 19 may be transmitting RF signals for RF-based sensing and lighting device 14 may be receiving these RF signals.

These same RF signals may be used to detect that sprinkler 84 is active, e.g. was triggered by an internal smoke sensor. The receiving lighting device may transmit the RF signals or characteristics thereof to a controller, the controller may analyze the disturbances to the radio frequency field and then transmit it to the user device 91 via a network infrastructure.

If the controller or the network infrastructure is down during the emergency, the emergency lighting devices may be able to locally communicate with the user device 91 of the first responder. This can be done, for example, by only during these emergency situations also enabling a secondary RF protocol in the emergency lighting devices which can be used for communication. For example, the emergency lighting devices may be capable of concurrent ZigBee and BLE operation. During normal operation, there is no need for BLE so it can be turned off completely, but upon emergency mode being triggered, the emergency lighting devices can turn BLE on so first responders' devices can connect to them, while ZigBee remains entirely used just for sensing.

Figure 6:
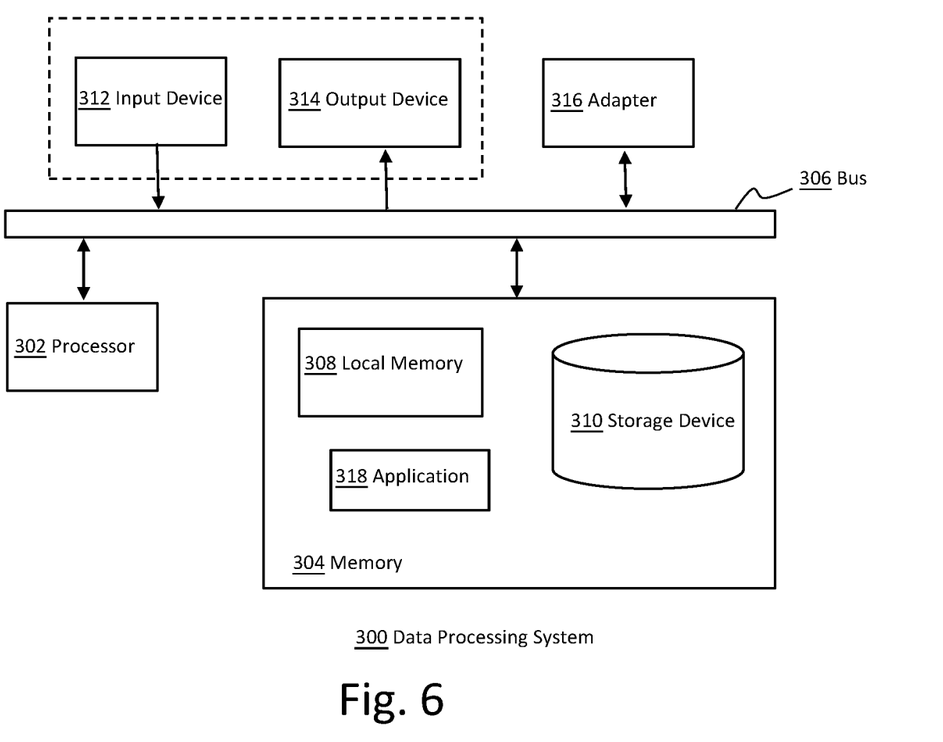
FIG. 6 is a block diagram of an exemplary data processing system for performing the method of the invention.

FIG. 6 depicts a block diagram illustrating an exemplary data processing system that may perform the method as described with reference to FIGS. 3 and 4.

As shown in FIG. 6, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 6 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 6, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 6) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. An electronic device for use in a lighting system for rendering emergency lighting, said electronic device comprising:
   at least one communication interface; and
   at least one processor configured to:
   detect a switch from a normal mode of said lighting system to an emergency mode of said lighting system and a switch from said emergency mode to said normal mode,
   activate an emergency radio frequency-based sensing function upon detecting said switch from said normal mode to said emergency mode, and
   deactivate said emergency radio frequency-based sensing function upon detecting said switch from said emergency mode to said normal mode;
   wherein said emergency radio frequency-based sensing function comprises using said at least one communication interface to receive radio frequency signals and inferring motion or presence of people by detecting disturbances to a radio frequency field affected by a human body, based on said received radio frequency signals.

2. The electronic device as claimed in claim 1, wherein said at least one processor is further configured, upon activation of said emergency radio frequency-based sensing function, to use said at least one communication interface to start to transmitting radio frequency signals.

3. The electronic device as claimed in claim 1,
   wherein said electronic device comprises a light source for rendering emergency lighting and said at least one processor is configured to turn on said light source upon detecting said switch from said normal mode to said emergency mode.

4. The electronic device as claimed in claim 1, wherein said at least one processor is configured to:
   use said at least one communication interface to control a further electronic device in said lighting system to activate said emergency radio frequency-based sensing function upon detecting said switch from said normal mode to said emergency mode, said further electronic device being capable of rendering emergency lighting, and
   use said at least one communication interface to control said further electronic device to deactivate said emergency radio frequency-based sensing function upon detecting said switch from said emergency mode to said normal mode.

5. The electronic device as claimed in claim 1, wherein said at least one processor is configured to use said at least one communication interface to activate a normal radio frequency-based sensing function upon detecting said switch from said emergency mode to said normal mode.

6. The electronic device as claimed in claim 5, wherein location tracking and/or activity detection is performed by said emergency radio frequency-based sensing function and people counting is performed by said normal radio frequency-based sensing function and/or said radio frequency-based sensing is performed with higher accuracy and/or with lower latency by said emergency radio frequency-based sensing function than by said normal radio frequency-based sensing function and/or a status of a door and/or window is determined by said emergency radio frequency-based sensing function.

7. The electronic device as claimed in claim 1, wherein said radio frequency-based sensing is performed by said emergency radio frequency-based sensing function in dependence on a charge level of at least one battery; of at least one electronic device in said lighting system.

8. The electronic device as claimed in claim 1, wherein a rate at which radio frequency signals are transmitted by said emergency radio frequency-based sensing function is repeatedly increased over time and/or radio frequency signals are transmitted at a higher or lower power by said emergency radio frequency-based sensing function than by a normal radio frequency-based sensing function.

9. The electronic device as claimed in claim 1, wherein said at least one processor is configured to use said at least one communication interface to transmit messages that comprise information determined using said emergency radio frequency-based sensing function to one or more user devices upon detecting said switch from said normal mode to said emergency mode.

10. The electronic device as claimed in claim 9, wherein said at least one processor is configured to determine whether signal strengths of received radio frequency signals are fluctuating according to a certain pattern in a certain spatial area and indicate said certain spatial area in one or more of said messages transmitted to said one or more user devices.

11. The electronic device as claimed in claim 9, wherein said at least one processor is configured to detect that one or more sprinklers are active in a certain spatial area and indicate said certain spatial area in one or more of said messages transmitted to said one or more user devices.

12. The electronic device as claimed in claim 1, wherein said at least one processor is configured to use said at least one communication interface to deactivate at least one function other than a radio frequency-based sensing function upon detecting said switch from said normal mode to said emergency mode.

13. A method for use in a lighting system for rendering emergency lighting, said method comprising:
   detecting a switch from a normal mode of said lighting system to an emergency mode of said lighting system and a switch from said emergency mode to said normal mode;
   activating an emergency radio frequency-based sensing function upon detecting said switch from said normal mode to said emergency mode; and
   deactivating said emergency radio frequency-based sensing function upon detecting said switch from said emergency mode to said normal mode;
   wherein said emergency radio frequency-based sensing function comprises using at least one communication interface to receive radio frequency signals and inferring motion or presence of people by detecting disturbances to a radio frequency field affected by a human body, based on said received radio frequency signals.

14. A nontransitory computer readable medium comprising at least one software code portion, the software code portion, when run on a computer system, being configured for enabling the method of claim 13 to be performed.

\* \* \* \* \*